United States Patent
Wang et al.

(10) Patent No.: US 8,477,755 B2
(45) Date of Patent: Jul. 2, 2013

(54) METHOD AND DEVICE FOR PROCESSING DATA IN DEDICATED PHYSICAL DATA CHANNEL

(75) Inventors: Zhibin Wang, Shenzhen (CN); Xiaolu Wang, Shenzhen (CN); Liang Xu, Shenzhen (CN); Jing Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 388 days.

(21) Appl. No.: 12/830,133

(22) Filed: Jul. 2, 2010

(65) Prior Publication Data

US 2010/0272071 A1 Oct. 28, 2010

Related U.S. Application Data

(63) Continuation of application No. PCT/CN2008/073893, filed on Dec. 31, 2008.

(30) Foreign Application Priority Data

Jan. 2, 2008 (CN) .......................... 2008 1 0000174

(51) Int. Cl.
*H04B 7/216* (2006.01)
*H04J 3/00* (2006.01)

(52) U.S. Cl.
USPC ........... 370/342; 370/441; 370/464; 370/465; 370/479; 375/220; 375/260; 455/127.1; 455/522

(58) Field of Classification Search
USPC ................. 370/342, 441, 464, 465, 479, 318, 370/320, 331–334; 375/141, 146, 147, 220, 375/260; 455/13.4, 69, 115.1, 127.1, 522, 455/436–444
See application file for complete search history.

(56) References Cited

U.S. PATENT DOCUMENTS 6,314,126 B1 * 11/2001 Schilling et al. .............. 375/130
6,985,471 B1 * 1/2006 Holma et al. ................. 370/342
(Continued)

FOREIGN PATENT DOCUMENTS

| CN | 1533066 A | 9/2004 |
|---|---|---|
| CN | 1543106 A | 11/2004 |

(Continued)

OTHER PUBLICATIONS

Written Opinion of the International Searching Authority in corresponding PCT Application No. PCT/CN2008/073893 (Feb. 19, 2009).

(Continued)

*Primary Examiner* — Michael Thier
*Assistant Examiner* — Benjamin H Elliott, IV
(74) *Attorney, Agent, or Firm* — Leydig, Voit & Mayer, Ltd.

(57) ABSTRACT

A method and a device for processing data in a dedicated physical data channel, comprising, when data on which softer handover is performed is extended DPDCH data, sending, after completing the softer merging of the data for one timeslot, a request for secondary despread, where the request contains channel numbers; acquiring the request for secondary despread, determining channels according to the channel numbers contained in the request for secondary despread, determining a channel having the highest priority from the channels according to a predetermined channel priority order, and secondarily despreading, framing and outputting data of the channel having the highest priority. Due to the arrangement of the extended DPDCH, embodiments of this invention process the data carried by the extended DPDCH at the frequency of timeslots, and thus reduce the time delay of the second despreading and support services having higher requirements for logic processing delay without affecting the process for the existing normal DPDCH data.

13 Claims, 5 Drawing Sheets

U.S. PATENT DOCUMENTS

| | | | |
|---|---|---|---|
| 7,187,667 B1* | 3/2007 | Minowa et al. | 370/335 |
| 7,490,219 B2* | 2/2009 | Matsui et al. | 712/28 |
| 8,023,897 B2* | 9/2011 | Cho et al. | 455/63.1 |
| 2002/0131381 A1* | 9/2002 | Kim et al. | 370/335 |
| 2004/0156423 A1* | 8/2004 | Li et al. | 375/148 |
| 2005/0068921 A1 | 3/2005 | Liu | |
| 2007/0189365 A1* | 8/2007 | Olsson et al. | 375/148 |
| 2008/0025374 A1* | 1/2008 | Yoshida | 375/130 |
| 2008/0089447 A1* | 4/2008 | Usuda et al. | 375/338 |
| 2010/0202575 A1* | 8/2010 | Farag et al. | 375/346 |
| 2010/0272071 A1* | 10/2010 | Wang et al. | 370/335 |

FOREIGN PATENT DOCUMENTS

| | | |
|---|---|---|
| CN | 101022674 A | 8/2007 |
| CN | 101217305 A | 7/2008 |
| EP | 1775982 A1 | 4/2007 |
| WO | WO 2007/041050 A1 | 4/2007 |

OTHER PUBLICATIONS

State Intellectual Property Office of the People's Republic of China, International Search Report in International Patent Application No. PCT/CN2008/073893 (Feb. 19, 2009).

* cited by examiner

METHOD AND DEVICE FOR PROCESSING DATA IN DEDICATED PHYSICAL DATA CHANNEL

CROSS-REFERENCE TO RELATED APPLICATIONS

This patent application is a continuation of International Application No. PCT/CN2008/073893, filed on Dec. 31, 2008, which claims priority to Chinese Patent Application No. 200810000174.2, filed on Jan. 2, 2008, both of which are hereby incorporated by reference in their entireties.

FIELD OF THE INVENTION

This invention relates to the technical field of communications, and more particularly to a method and a device for processing data in a dedicated physical data channel (DPDCH).

BACKGROUND OF THE INVENTION

Due to the excellent performance in enhancing transmission efficiency and improving spectrum efficiency, the multiple input multiple output (MIMO) technique has become now a hotspot of research among various multi-antennas technologies. In the high speed downlink packet access (HSDPA) system, the MIMO technique uses double antenna (two spatial data streams) to transmit the information of a single user, and these two spatial data streams can be carried either over two dedicated physical data channels for HS-DSCH or carried by different modes of a single HS-DPDCH.

Figure 1:
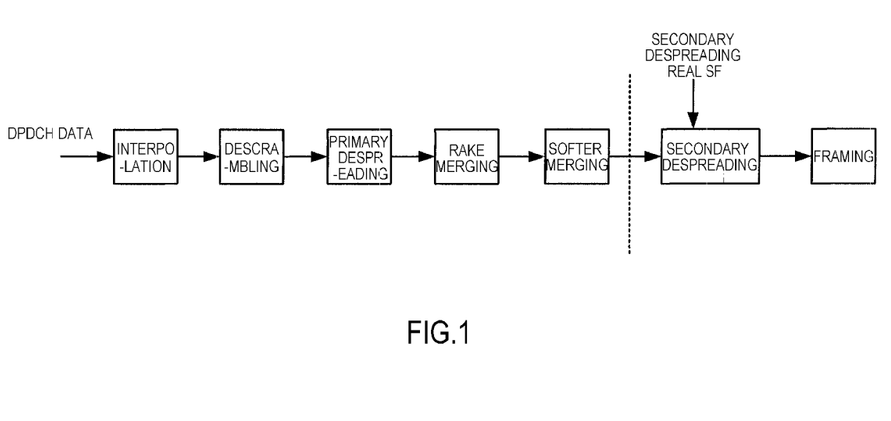
FIG. 1 is a flowchart showing conventional processing of DPDCH data.

The process of processing data in a conventional DPDCH is shown in FIG. 1: after subjecting the DPDCH data to the steps of interpolation, descrambling, primarily despreading, RAKE merging and softer merging, the DPDCH data is performed with secondary despreading and framing.

According to a protocol, after softer merging of one frame of DPDCH data, the transport format combination indicator (TFCI) symbol of this frame of DPDCH data is obtained, the real spread factor (SF) is obtained by TFCI decoding, and the softer-handover DPDCH data is hence secondarily despread according to the SF and framed.

Currently available DPDCH data processing methods have at least the following deficiency: The secondary despreading operation can be performed only after one frame of data has been completely received; in other words, data in the previous timeslot of one frame is processed only when the frame completes, and this leads to relatively great logic processing delay. Due to such logic processing delay, it is impossible for the currently available DPDCH data processing methods to support services having high requirements for the logic processing delay, such as the HSDPA MIMO service and the HSPA+ service, where the HSPA+ service is a service further evolved and enhanced from HSPA, including HSDPA and HSUPA, of which HSUPA is high speed uplink access.

SUMMARY OF THE INVENTION

Embodiments of the present invention provide a method and a device for processing data in a dedicated physical data channel, so as to solve the inability of conventional devices to support services having higher requirements for the logic processing delay.

Embodiments of the present invention are realized as follows.

A method for processing data in a dedicated physical data channel includes: when data on which softer handover is performed is extended DPDCH data, sending, after completing the softer merging for one timeslot of the data, a request for secondary despread, where the request contains channel numbers; and acquiring the request for secondary despread, determining channels according to the channel numbers contained in the request for secondary despread, determining a channel having the highest priority from the channels according to a predetermined channel priority order, and secondarily despreading, framing and outputting data of the channel having the highest priority.

A device for processing data in a dedicated physical data channel includes:

a first processing unit, when it is determined that data on which softer handover is performed is extended DPDCH data, configured to send, after completing the softer merging for one timeslot of the data, a request for secondary despread, where the request contains channel numbers; a queuing unit, configured to receive the request for secondary despread, determine channels according to the channel numbers contained in the request for secondary despread, and determine a channel having the highest priority from the channels according to a predetermined channel priority order; a secondarily despreading unit, configured to secondarily despread and output data of the channel having the highest priority; and a framing unit, configured to receive and frame the secondarily despread data, and output the data after framing.

As can be seen from the preceding technical solutions, in comparison with the conventional devices, due to the arrangement of the extended DPDCH, the embodiments of the present invention process the data carried by the extended DPDCH at the frequency of timeslots. Therefore, this reduces the time delay of the second despreading and supports services having higher requirements for the logic processing delay without affecting the process for the existing normal DPDCH data.

BRIEF DESCRIPTIONS OF THE DRAWINGS

To make more apparent the technical solutions in the embodiments of the present invention over conventional devices, drawings necessary for illustration of the embodiments of the present invention and of conventional devices are briefly presented below. Obviously, the drawings as presented below are merely directed to certain embodiments of the present invention, and it is possible for persons ordinarily skilled in the art to obtain other drawings based on these drawings without spending creative effort.

DETAILED DESCRIPTION OF THE INVENTION

Through prearrangement of the extended DPDCH, the embodiments of the present invention process the data carried by the extended DPDCH at the frequency of timeslots, so as to carry services having higher requirements for time delay.

The technical solutions in the embodiments of the present invention are described clearly and completely below with reference to the drawings. Apparently, the embodiments as described below are only part, rather than all of embodiments of the present invention. Any other embodiments obtainable by those ordinarily skilled in the art based on the embodiments of the present invention without creative effort shall be covered by the protection scope of the present invention.

Figure 2:
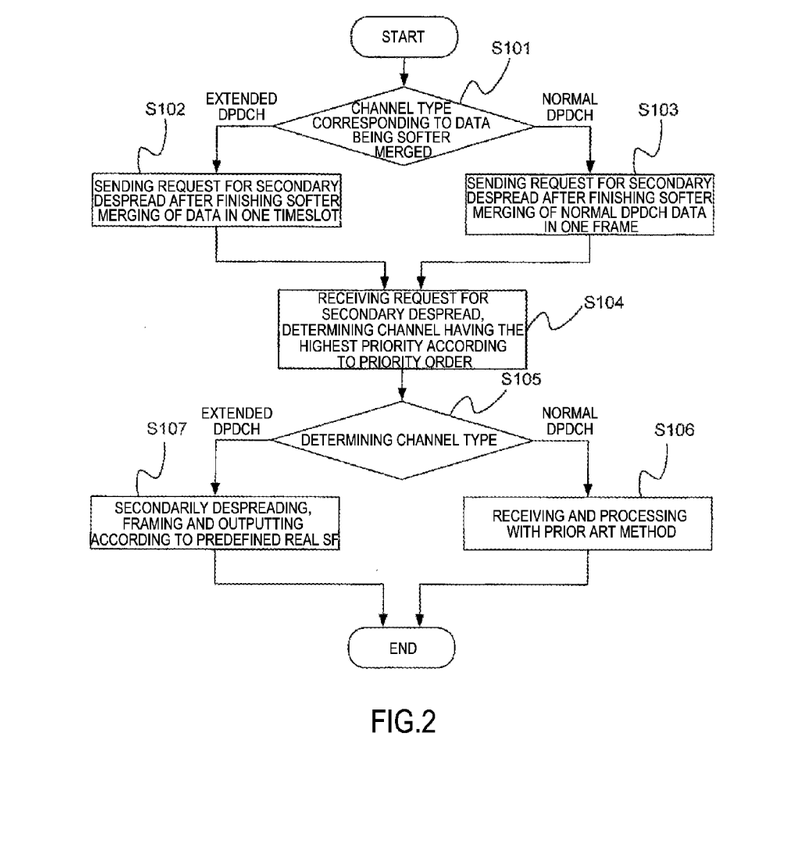
FIG. 2 is a flowchart showing a method for processing data in a dedicated physical data channel according to Embodiment 1 of the present invention.

Refer to FIG. 2, which is a flowchart showing a method for processing data in a dedicated physical data channel according to Embodiment 1 of the present invention.

A DPDCH different from the existing DPDCH is preset (to differentiate from the existing DPDCH, the existing DPDCH is hereinafter referred to as the normal DPDCH, while the preset DPDCH is referred to as the extended DPDCH).

The extended DPDCH carries services having higher requirements for the logic processing delay, such as the HSDPA MIMO service and the HSPA+ service.

The process specifically includes the following steps:

Step S101: Determine whether the data on which softer handover is performed is the extended DPDCH data. If the data on which softer handover is performed is the extended DPDCH data, the process goes to S102; if the data on which softer handover is performed is not the extended DPDCH data, the process goes to step S103.

Step S102: Send a request for secondary despread containing first indication information after completing the softer handover process for one timeslot of the extended DPDCH, and the process goes to step S104.

The indication information indicates that the data is the extended DPDCH data.

Step S103: Send a request for secondary despread after completing softer handover of one frame of normal DPDCH data.

Step S104: Receive the request for secondary despread, and determine a channel having the highest priority according to a priority order.

The request for secondary despread contains channel numbers.

Determining the channel having the highest priority according to the priority order is carried out in the following mode: the request for secondary despread is queued up, corresponding channels are determined from the channel numbers contained therein, and the channel having the highest priority is determined from the channels of the request for secondary despread according to a predetermined channel priority order.

The channel priority order can either be predetermined, or adjusted according to the actual operational circumstance of the network or the demand of the user.

Step S105: Determine whether the channel is a normal DPDCH channel or an extended DPDCH channel. and tf the channel is a normal DPDCH channel, the process goes to step S106; if the channel is an extended DPDCH channel, the process goes to step S107.

Step S106: Determine the TFCI symbol of the frame data of the normal DPDCH, obtain a real SF via TFCI decoding, secondarily despread the DPDCH data according to the SF, and then frame the DPDCH data.

Step S107: Secondarily despread, the extended DPDCH data according to the predetermined real SF, then frame and output the extended DPDCH data.

The SF of the service data transmitted over the extended DPDCH can either be predetermined, or obtained via TFCI decoding.

Without affecting the existing normal DPDCH process, this embodiment of the present invention uses the extended DPDCH (service data having higher requirements for the logic processing delay, such as the HSDPA MIMO service data) to transmit other data, and processes the data at the preset frequency (of timeslot, for example).

Moreover, because it is necessary to simultaneously support processing of the normal DPDCH data and processing of the extended DPDCH data, the processing delay of the secondary despread might be greater than one timeslot, and if the request information for secondary despread of the extended DPDCH is output in timeslot, information might be lost due to overtime. Assume the register for storing the request signal currently stores the extended DPDCH data softer-handover completion signal of the nth timeslot, if the signal is not processed within one timeslot, the extended DPDCH data softer-handover completion signal of the nth timeslot will be covered when the extended DPDCH data softer merging completion signal of the next timeslot comes.

Accordingly, to enable the embodiment of the present invention to achieve better effects, the embodiment of the present invention can also employ the mode of multi-stage caching for the request for secondary despread.

Explanations are made below by taking secondary cache for example only.

After one timeslot of the extended DPDCH data has been processed in a softer handover process or after one frame of normal DPDCH data has been processed in a softer handover process, the request for secondary despread as sent is stored in timeslot in a register set (including a primary register and a secondary register) having secondary cache function. If secondary despread of the channel has been completed, or if the secondary cache of the request signal is invalid while the primary cache is valid, or if the primary cache of the request signal is valid and a new request signal arrives, the secondary cache of the request signal will be cleared, and the request signal is transferred from the primary cache to the secondary cache.

Because the extended DPDCH data is processed in timeslot, whereas the normal DPDCH data is processed in frame, the priority of the extended DPDCH is higher than that of the normal DPDCH in general circumstances.

As should be noted, during the process of processing the DPDCH data, the SF obtained by primary despread is usually small. If the extended DPDCH carries the HSDPA MIMO service, the SF is usually 256, so that it is possible to perform secondary despreading according to a predetermined SF.

As should also be noted, after the secondary despreading is performed, control information required by HSDPA MIMO and HSPA+ is added during framing and outputting, and the control information includes noise energy and attenuation factor energy, so as to facilitate DSP or corresponding software to further process the data.

The embodiment of the present invention further discloses a device for processing data in a DPDCH.

Figure 3:
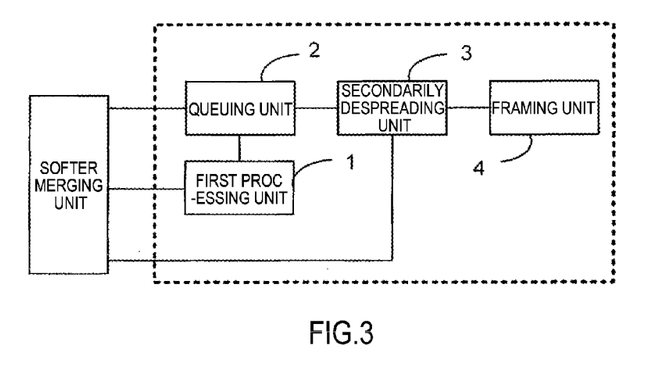
FIG. 3 is a schematic diagram of a device for processing data in a DPDCH according to Embodiment 1 of the present invention.

Refer to FIG. 3, which is a schematic diagram of the device for processing data in a DPDCH according to Embodiment 1 of the present invention.

This embodiment of the present invention transmits other service data via the extended DPDCH, and includes a first processing unit 1, a queuing unit 2, a secondarily despreading unit 3, and a framing unit 4.

The first processing unit 1 determines in real time the data being processed in the process of softer handover, and when it determines the data being processed in the process of softer handover is extended DPDCH data, it sends a request for secondary despread containing channel number after one timeslot of the data finishes the process of softer handover.

The queuing unit 2 receives and caches the request for secondary despread, determines a channel having the highest priority according to a predetermined channel priority order, and provides the channel number to the secondarily despreading unit 3.

Upon reception of the channel number, the secondarily despreading unit 3 acquires the data from the corresponding physical channel, performs the secondary despread process, and outputs the processing result.

The framing unit 4 receives and frames the processing result, and outputs the result after framing.

The SF based on which the secondarily despreading unit 3 performs the process of secondary despread can either be predetermined, or obtained through TFCI (Transport Format Combination Indicator) decoding by acquiring the TFCI symbol of a certain amount of data.

State switching between each of the units can be realized by a state machine or any other device having the function of the state machine.

This embodiment of the present invention may transmit other service data by increasing the extended DPDCH without affecting data processing of the normal DPDCH.

Figure 4:
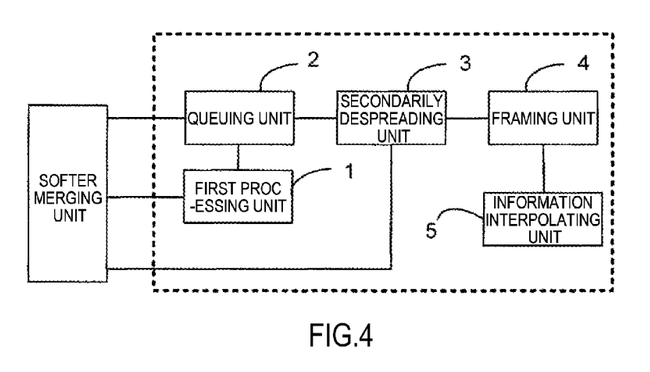
FIG. 4 is a schematic diagram of a device for processing data in a DPDCH according to Embodiment 2 of the present invention.

FIG. 4 is a schematic diagram of a device for processing DPDCH data according to Embodiment 2 of the present invention.

Because the embodiment of the present invention transmits other data (HSDPA MIMO or HSPA+ service data, or other service data) over the extended DPDCH, certain control information is interpolated when the framing unit 4 frames the data, so that a corresponding functional unit correspondingly processes the data according to the control information after the data is framed and outputted.

Accordingly, on the basis of the above embodiments, this embodiment of the present invention can further include an information interpolating unit 5 configured to interpolate control information which corresponds to the extended DPDCH data when the framing unit 4 frames the data.

The control information can include information indicative of noise energy or attenuation factor energy, so that, after the data is framed and outputted, the DSP functional unit can further process the extent of the data according to the noise energy and the attenuation factor energy.

The processing delay of the secondarily despreading unit 3 might be larger than one timeslot, while the request information for secondary despread of the extended DPDCH is output in timeslot, hence information might be lost due to overtime. To achieve better effects, the queuing unit 2 in all of the foregoing embodiments has a structure with cache function, so as to perform multi-stage caching on the request for secondary despread that corresponds to the extended DPDCH or the normal DPDCH.

Figure 5:
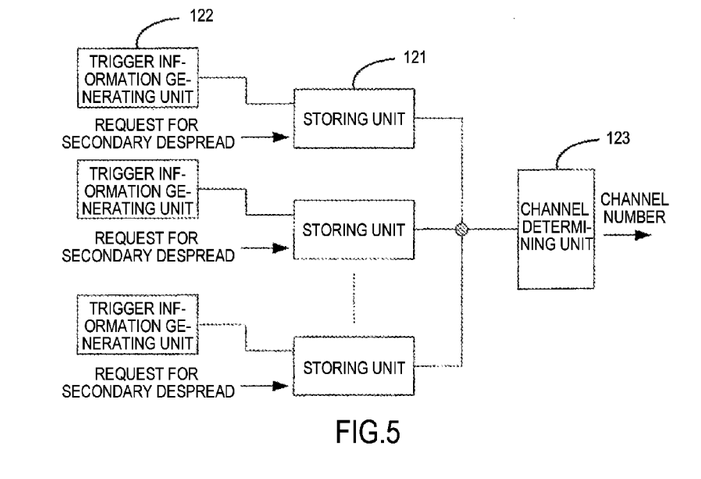
FIG. 5 is a schematic diagram of a queuing unit of a device for processing data in a DPDCH according to Embodiment 3 of the present invention.

FIG. 5 is a schematic diagram of the queuing unit according to Embodiment 3 of the present invention.

The queuing unit 2 can include a plurality of storing units 121, trigger information generating units 122 and a channel determining unit 123.

One storing unit corresponds to one channel, one trigger information generating unit corresponds to one storing unit, and each storing unit 121 has a multi-stage storage for storing the request for secondary despread in stages, and providing the request signal in the storage of the highest stage to the channel determining unit 123 on reception of the trigger information generated by the corresponding trigger information generating unit 122.

The channel determining unit 123 determines, according to a predetermined channel priority order, the channel having the highest priority from the received request for secondary despread sent from each storing unit 121, and provides the channel number to the secondarily despreading unit 3 for processing.

Structures and operational principles of the constituent units of the queuing unit 12 are described in greater detail below.

Figure 6:
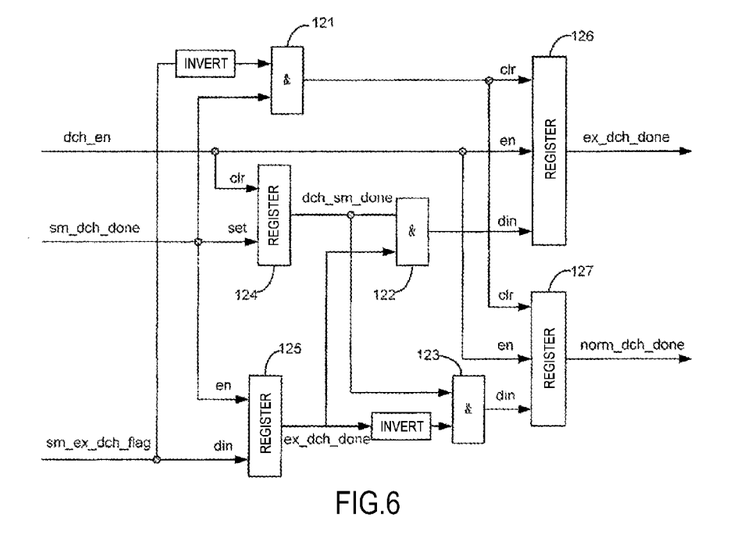
FIG. 6 is a schematic diagram of a storing unit of a queuing unit of a device for processing data in a DPDCH according to Embodiment 4 of the present invention.

Refer to FIG. 6, which is a schematic diagram of the storing unit of the queuing unit according to Embodiment 4 of the present invention.

The storing unit 121 can include a plurality of AND gates (a first AND gate 121, a second AND gate 122, and a third AND gate 123) and a plurality of registers (a first register 124, a second register 125, a third register 126, and a fourth register 127).

An input terminal of the first AND gate 121, a set port of the first register 124, and an en port of the second register 125 are simultaneously connected to output terminals of a softer handover unit and the first processing unit 1 to receive sm_dch_done, which is a signal indicating that softer handover for one time slot of extended DPDCH data has been completed or a signal indicating that softer handover for one frame of normal DPDCH data has been completed, sent from the softer handover unit or the first processing unit 1.

Another input terminal of the first AND gate 121 and another input terminal of the second register 125 receive extended DPDCH indication.

An output terminal of the first AND gate 121 is simultaneously connected to clr ports of the third register 126 and the fourth register 127, an output terminal of the first register 124 is connected to one input terminal of the second AND gate 122, another input terminal of the second AND gate 122 is connected to an output terminal of the second register 125, and an output terminal of the second register 125 is connected to one input terminal of the third AND gate 123 via an inverting unit. Another input terminal of the third AND gate 123 is connected to an output terminal of the register 125.

An output terminal of the second AND gate 122 is connected to a din port of the third register 126.

An output terminal of the third AND gate 123 is connected to a din port of the fourth register 127.

En ports of the third register 126 and the fourth register 127 are configured to receive trigger information (dch_en). The clr port of the first register 124 also receives this trigger information.

Set stands for a set port, clr stands for a clear port, and en stands for an enable port. Din is a serial data input signal, and the priority of each port is in a decreasing order as: set>clr>en.

Therefore, when sm_dch_done is valid, or in other words, once the softer handover for one new frame of normal DPDCH data has been completed, or once the softer handover for one new timeslot of extended DPDCH data has been completed, the first register 124 will update according to new data.

If sm_dch_done is a signal indicating that softer handover for one frame of normal DPDCH data has been completed, the output terminal of the first AND gate 121 is valid, that is to say, the clr of the register 124 is valid, at the same time, the output terminal dch_sm_done of the first register 124 is valid; the second register 125 stores therein sm_ex_dch_flag, and its output terminal ex_dch_flag is valid. Accordingly, the output terminal of the second AND gate 122 is invalid, and the output terminal ex_dch_done of the third register 126 is invalid; the output terminal of the third AND gate 123 is valid, and when the en signal comes, the request signal for secondary despread for the normal DPDCH is written into the fourth register 127, and norm_dch_done is valid.

If sm_dch_done is a signal indicating that the softer handover for one time slot of extended DPDCH data has been completed, the output terminal of the first AND gate 121 is invalid, the output terminal of the second AND gate 122 is valid, and the output terminal of the third AND gate 123 is invalid; accordingly, the output terminal ex_dch_done of the third register 126 is valid, and the output terminal norm_dch_done of the fourth register 127 is invalid.

Conditions for generating the trigger information (dch_en) can be as follows:

1: the secondary despread of the channel is completed;
2: the secondary cache of the request signal is invalid while the primary cache thereof is valid;
3: the primary cache of the request signal is valid and a new request signal arrives.

Figure 7:
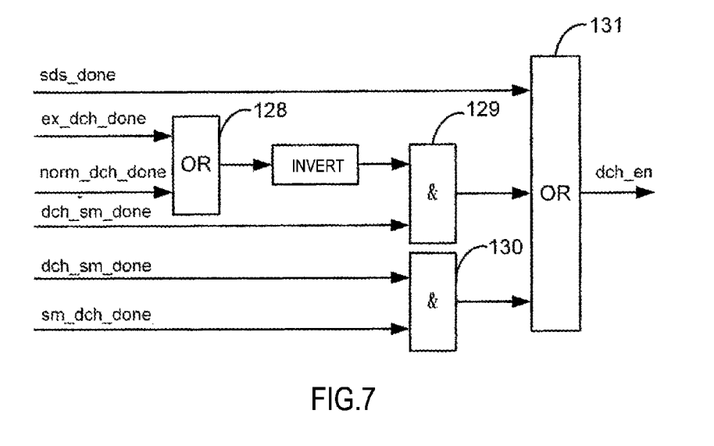
FIG. 7 is a schematic diagram of a trigger information generating unit of a queuing unit of a device for processing data in a DPDCH according to Embodiment 5 of the present invention.

The trigger information is generated by the trigger information generating unit 122, whose structure is as shown in FIG. 7.

The trigger information generating unit 122 includes a first OR gate 128, a fourth AND gate 129, a fifth AND gate 130, and a second OR gate 131.

sds_done is a signal representing the completion of secondary despread, ex_dch_done is a signal representing the completion of softer handover of the extended DPDCH data, norm_dch_done is a signal represents the completion of softer handover of normal DPDCH data, dch_sm_done represents the primary cache output signal, and sm_dch_done represents a signal indicating incoming new extended DPDCH data or normal DPDCH data.

Two input terminals of the first OR gate 128 are separately configured to receive ex_dch_done and norm_dch_done separately, an output terminal thereof is connected to one input terminal of the fourth AND gate 129, and an inverting unit is connected in series on the connecting line thereof. Another input terminal of the fourth AND gate 129 receives dch_sm_done, and an output terminal thereof is connected to one input terminal of the second OR gate 131. Two input terminals of the fifth AND gate 130 are configured separately receive dch_sm_done and sm_dch_done separately, and an output terminal thereof is connected to another input terminal of the second OR gate 131. A yet another input terminal of the second OR gate 131 is configured to receive sds_done.

As should be noted, in all of the above embodiments, the queuing unit 12 selects the channel having the highest priority separately from the normal DPDCH and the extended DPDCH according to the predetermined priority order. Because the extended DPDCH should be processed in time, one extended DPDCH in each timeslot, the priority of the extended DPDCH is higher than that of the normal DPDCH. The queuing unit 12 latches the determined channel number in the idle state, and the secondarily despreading unit 13 obtains the data of the channel and performs secondary despread process.

Figure 8:
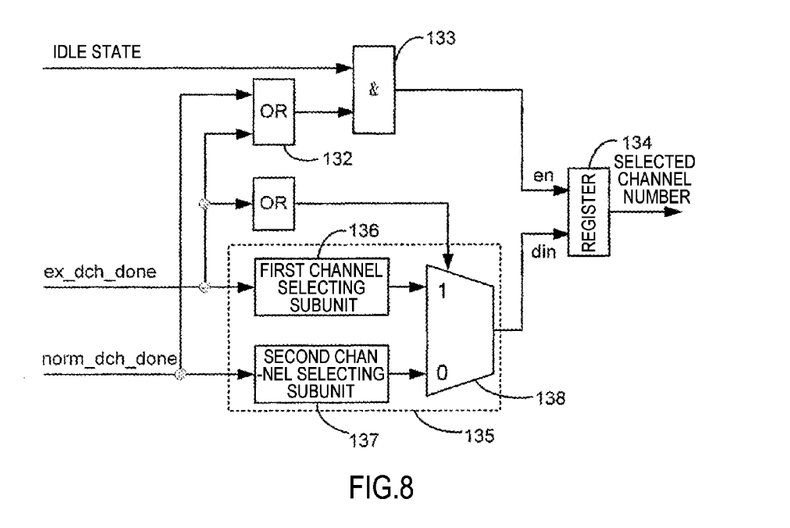
FIG. 8 is a schematic diagram of a channel determining unit of a queuing unit of a device for processing data in a DPDCH according to Embodiment 6 of the present invention.

FIG. 8 is a schematic diagram of the channel determining unit 123 of the queuing unit according to Embodiment 6 of the present invention.

The channel determining unit 123 includes a third OR gate 132, a sixth AND gate 133, a fifth register 134, and a channel selecting unit 135.

Two input terminals of the third OR gate 132 separately receive the requests for secondary despread of the extended DPDCH and the normal DPDCH, an output terminal thereof is connected to one input terminal of the sixth AND gate 133, another input terminal of the sixth AND gate 133 receives an idle state signal, and an output terminal of the sixth AND gate 133 is connected to an enable port en of the fifth register 134.

An output terminal of the fifth register 134 is connected to the secondarily despreading unit 3.

The channel selecting unit 135 is configured to receive the requests for secondary despread of the extended DPDCH and the normal DPDCH with its input terminal, select the channel having the highest priority according to the requests for secondary despread, and output the channel via its output terminal.

The channel selecting unit 135 includes a first channel selecting subunit 136, a second channel selecting subunit 137 and a third channel selecting subunit 138.

The first channel selecting subunit 136 is configured to receive the request for secondary despread of the extended DPDCH with its input terminal, determine channels according to channel numbers contained in the request for secondary despread, determine the channel having the highest priority by referring to the predetermined channel priority order, and output the result via its output terminal.

The second channel selecting subunit 137 is configured to receive the request for secondary despread of the normal DPDCH with its input terminal, select the channel having the highest priority according to the request for secondary despread, and output the result via its output terminal.

The third channel selecting subunit 138 includes two input terminals and one output terminal, of which the first input terminal is connected to the output terminal of the first channel selecting subunit 136, the second input terminal is connected to the output terminal of the second channel selecting subunit 137, and the output terminal is connected to the din port of the register 134. The first input terminal is set with a high level, the second input terminal is set with a low level, the signal received by the first input terminal with the high level and sent from the first channel selecting subunit 136 is valid, and the signal received by the second input terminal with the low level and sent from the second channel selecting subunit 137 is invalid, so that the channel number of the extended DPDCH is preferentially outputted to the register 134.

The present invention further discloses a base station device, which differs from existing base station devices in the fact that the device for processing data in a dedicated physical data channel contained therein is different from existing devices. The structure and operating principle of the device for processing data in a dedicated physical data channel contained therein have been described in detail above, and no repetition is made here.

Those disclosed above are merely preferred embodiments of the present invention, but the present invention is not restricted thereto, as all variations conceivable to those skilled in the art without creative effort as well as improvements and modifications made without departing from the principles of the present invention shall be covered within the protection scope of the present invention.

The invention claimed is:

1. A method for processing data in a dedicated physical data channel (DPDCH) in a wireless communication system, comprising:

receiving by a receiver the data from a transmitter;

sending, by a first processor of the receiver, a request for secondary despread, when the data on which an softer handover is performed received from the transmitter is extended DPDCH data and after completing the softer handover for one timeslot of the extended DPDCH data, wherein the request for the secondary despread contains channel indices;

storing, by a memory of the receiver, the request for the secondary despread; and acquiring, by a second processor of the receiver, the request for the secondary despread from the memory, determining channels according to the channel indices contained in the request for the secondary despread, and determining a channel having the highest priority from the channels according to a predetermined channel priority order, wherein the first processor performs secondarily despreading, framing and outputting data of the channel having the highest priority.

2. The method according to claim 1, further comprising performing multi-stage caching on the acquired request for secondary despread.

3. The method according to claim 1, further comprising adding control information during the framing, wherein the control information corresponds to the extended DPDCH data and includes information indicative of noise energy and attenuation factor energy.

4. The method according to claim 1, wherein the step of secondarily despreading the data of the channel having the highest priority comprises using a predetermined real spread factor to secondarily despread the data of the channel having the highest priority.

5. A receiver for processing data in a dedicated physical data channel (DPDCH) received from a transmitter in a wireless communication system, comprising:

a first processor, configured to perform a softer handover for the data received from the transmitter and to determine whether the data on which the softer handover is performed is extended DPDCH data and configured to send a request for secondary despread that contains channel indices when the following two conditions are satisfied: (1) after the first processor completes the softer handover for one timeslot of the extended DPDCH data and (2) when the first processor determines that the data on which softer handover is performed is the extended DPDCH data;

a memory, configured to receive the request for the secondary despread from the first processor and to store the request for the secondary despread; and a second processor, configured to acquire the request for the secondary despread from the memory, determine channels according to the channel indices contained in the request for the secondary despread, and determine a channel having the highest priority from the channels according to a predetermined channel priority order.

6. The receiver according to claim 5, wherein the first processor is further configured to:

secondarily despread and output data of the channel having the highest priority; and receive and frame the secondarily despread data of the channel having the highest priority, and output the secondarily despread data of the channel having the highest priority after framing.

7. The receiver according to claim 6, wherein the first processor is further configured to:

interpolate control information when the first processor frames the secondarily despread data of the channel having the highest priority, wherein the control information corresponds to the extended DPDCH data and includes information indicative of noise energy and attenuation factor energy.

8. The receiver according to claim 5, wherein the second processor comprises:

a trigger information generating circuitry, configured to generate trigger information and to output the trigger information to the memory, wherein the memory is further configured to output, after receiving the trigger information from the trigger information generating circuitry, the request for the secondary despread, where the request for the secondary despread contains channel indices; and a channel determining circuitry, configured to receive the request for secondary despread from the memory, determine channels according to the channel indices contained in the request for secondary despread, and determine a channel having the highest priority from the channels according to a predetermined channel priority order.

9. The receiver according to claim 8, wherein the memory has a multi-level storage structure.

10. The receiver according to claim 9, wherein the memory comprises a plurality of subunits each of which corresponds to a channel and the plurality of subunits including a first AND gate, a second AND gate, a third AND gate, a first register, a second register, a third register, and a fourth register, wherein a clear port of the first register, an enable port of the third register and an enable port of the fourth register receive a trigger signal; a set port of the first register, an enable port of the second register and one input terminal of the first AND gate receive the request for the secondary despread, a data input terminal of the second register receives extended DPDCH indication information, another input terminal of the first AND gate is connected to one end of an first inverting unit, and another end of the first inverting unit is used to receive the DPDCH indication information; an output terminal of the first register is connected to input terminals of the second AND gate and the third AND gate; another input terminal of the second AND gate and an output terminal of the second register are connected to one end of an second inverting unit, and another end of the second inverting unit is connected to another input terminal of the third AND gate; an output terminal of the second AND gate is connected to a data input terminal of the third register, and an output terminal of the third AND gate is connected to a data input terminal of the fourth register;

an output terminal of the first AND gate is connected to clear ports of the third register and the fourth register; and output terminals of the third register and the fourth register are connected to an input terminal of the channel determining circuitry.

11. The receiver according to claim 8, wherein the trigger information generating circuitry comprises a first OR gate, a second OR gate, a fourth AND gate, and a fifth AND gate, wherein two input terminals of the first OR gate separately receive requests for secondary despread of extended DPDCH data and normal DPDCH data, an output terminal of the first OR gate is connected to one end of an inverting unit, and another end of the inverting unit is connected to one input terminal of the fourth AND gate;

another input terminal of the fourth AND gate receives a primary cache signal, and an output terminal of the fourth AND gate is connected to one input terminal of the second OR gate;

two input terminals of the fifth AND gate separately receive a primary cache signal and a request for secondary despread, and an output terminal of the fifth AND gate is connected to another input terminal of the second OR gate; and yet another input terminal of the second OR gate receives a second despreading completion signal, and an output terminal of the second OR gate outputs a trigger signal.

12. The receiver according to claim 8, wherein the channel determining circuitry comprises a third OR gate, a sixth AND gate, a channel selecting unit and a fifth register, two input terminals of the channel selecting unit separately receive requests for the secondary despread of the extended DPDCH and the DPDCH, and an output terminal of the channel selecting unit is connected to a data input terminal of the fifth register;

two input terminals of the third OR gate separately receive requests for secondary despread of extended DPDCH and normal DPDCH, and an output terminal of the third OR gate is connected to an input terminal of the sixth AND gate, another input terminal of the sixth AND gate receives an idle state signal, and an output terminal of the sixth AND gate is connected to an enable port of the fifth register; and an output terminal of the fifth register is connected to the first processor.

13. The receiver according to claim 12, wherein the channel selecting unit comprises a first channel selecting subunit, a second channel selecting subunit, and a third channel selecting subunit, wherein the first channel selecting subunit, which has an input terminal used as one input terminal of the channel selecting unit and an output terminal, is configured to receive a request for the secondary despread of the extended DPDCH, determine channels according to channel indices contained in the request for secondary despread, determine a channel having the highest priority from the channels, and output the channel index of the channel having the highest priority;

the second channel selecting subunit, which has an input terminal used as another input terminal of the channel selecting unit and an output terminal, is configured to receive a request for the secondary despread of the DPDCH, determine channels according to channel indices contained in the request for secondary despread, determine a channel having the highest priority from the channels, and output the channel index of the channel having the highest priority; and the third channel selecting subunit, which has a first input terminal connected to the output terminal of the first channel selecting subunit, a second input terminal connected to the output terminal of the second channel selecting subunit, and an output terminal used as the output terminal of the channel selecting unit and connected to the data input terminal of the fifth register, configured to make a signal received from the first input terminal being in high level take effect and make a signal received from the second input terminal being in low level not take effect by setting level values of the first input terminal and the second input terminal.

\* \* \* \* \*